United States Patent
Buhl et al.

(10) Patent No.: US 9,954,673 B2
(45) Date of Patent: Apr. 24, 2018

(54) METHOD FOR TIME SYNCHRONIZATION IN A COMMUNICATION NETWORK

(71) Applicant: Siemens Aktiengesellschaft, Munich (DE)

(72) Inventors: Michael Bernhard Buhl, Grafing (DE); Dragan Obradovic, Ottobrunn (DE); Ruxandra Scheiterer, Geretsried (DE); Günter Steindl, Poppenricht (DE)

(73) Assignee: Siemens Aktiengesellschaft, Munich (DE)

( * ) Notice: Subject to any disclaimer, the term of this patent is extended or adjusted under 35 U.S.C. 154(b) by 173 days.

(21) Appl. No.: 14/263,692

(22) Filed: Apr. 28, 2014

(65) Prior Publication Data
US 2014/0321481 A1 Oct. 30, 2014

(30) Foreign Application Priority Data
Apr. 29, 2013 (EP) .................................... 13165771

(51) Int. Cl.
*H04L 7/00* (2006.01)
*H04L 12/42* (2006.01)
(Continued)

(52) U.S. Cl.
CPC .......... *H04L 7/0033* (2013.01); *H04J 3/0638* (2013.01); *H04L 12/422* (2013.01); *H04L 41/12* (2013.01); *H04J 3/0664* (2013.01)

(58) Field of Classification Search
CPC ... H04L 7/0033; H04L 7/0016; H04L 7/0037; H04L 7/0041; H04L 12/422; H04L 41/12; H04J 3/0638; H04J 3/0664
See application file for complete search history.

(56) References Cited

U.S. PATENT DOCUMENTS

| 7,280,550 B1 | 10/2007 | Rosenboom |
| 2006/0203851 A1* | 9/2006 | Eidson .................. H04J 3/0667 370/503 |

(Continued)

FOREIGN PATENT DOCUMENTS

| CN | 102857376 | 1/2013 |
| EP | 2312775 | 4/2011 |

OTHER PUBLICATIONS

Ruxandra Lupas Scheiterer; Synchronization Performance of the Precision Time Protocol in Industrial Automation Networks; Jun. 2009; IEEE Transactions on Instrumentation and Measurement; vol. 58, No. 6.*

(Continued)

*Primary Examiner* — Ricky Ngo
*Assistant Examiner* — Stephen Steiner
(74) *Attorney, Agent, or Firm* — Cozen O'Connor (57) ABSTRACT

A method for time synchronization in a communication network comprising a multiplicity of network nodes, wherein synchronization messages are transmitted in the communication network and the synchronization message received in a slave node contains synchronization information for synchronizing the slave time of the slave node with the master time, i.e., synchronization messages are transmitted in a closed ring or line topology and the slave node receives first and second synchronization messages from different transmission directions, and wherein the slave node synchronizes a first time with the synchronization message from one transmission direction and a second time with the synchronization message from the other transmission direction.

21 Claims, 2 Drawing Sheets

(51) Int. Cl.
    *H04L 12/24*    (2006.01)
    *H04J 3/06*     (2006.01)

(56) References Cited

U.S. PATENT DOCUMENTS

| | | | |
|---|---|---|---|
| 2007/0223537 A1* | 9/2007 | Crowle | H04J 3/0667 |
| | | | 370/503 |
| 2008/0175275 A1* | 7/2008 | Garner | H04J 3/0667 |
| | | | 370/503 |
| 2009/0141699 A1 | 6/2009 | Goshen et al. | |

OTHER PUBLICATIONS

IEEE 1588, "Precision Clock Synchronization Protocol for Networked Measurement and control Systems", IEC 61588; XP002367391 IEEE; 2-8318-7541-2; Sep. 1, 2004.
IEEE 1588 V2, IEEE "Standard for a Precision Clock Synchronization Protocol for Networked Measurement and Control Systems", Jul. 24, 2008.
IEEE 802.1AS, "Timing and Synchronization for Time-Sensitive Applications in Bridged Local Area Networks", Mar. 30, 2011, (292 pages).
Office Action dated Jul. 13, 2017 which issued in the corresponding Chinese Patent Application No. 2014101748397.

* cited by examiner

METHOD FOR TIME SYNCHRONIZATION IN A COMMUNICATION NETWORK

BACKGROUND OF THE INVENTION

1. Field of the Invention

The invention relates to a method for time synchronization in a communication network, and to a corresponding communication network.

2. Description of the Related Art

In many technical applications of communication networks it is necessary to temporally synchronize the network nodes participating in the communication, such that all the network nodes provide exactly synchronous time information. In particular, within industrial automation installations, it is particularly important that the automatic work operations of different network nodes be accurately temporally coordinated with one another.

Various standards for time synchronization in communication networks, are known from the prior art, e.g., Institute of Electrical and Electronic Engineer (IEEE) standard 1588, IEEE standard 802.1AS and International Electrotechnical Commission (IEC) standard 61158. In this case, the time information of a master node, which detects the time with a master clock, is communicated to all the other subscribers in the communication network, which constitute slave nodes. The time information is contained in synchronization messages that are forwarded by the salve nodes. Upon forwarding, the slave nodes add all propagation time delays known to them to the content of the synchronization message. In this way, a slave node can synchronize its slave time, which it detects with an internal clock, with the master time based on the content of the synchronization messages.

In the known standards, each node adds to corresponding fields of the synchronization message firstly an internal processing time (a Bridge Delay) and secondly a transmission time (a Line Delay). The internal processing time specifies the time duration required by a node for processing the messages between reception and re-emission. By contrast, the transmission time defines the time period between the emission of the message at the preceding network node and the reception at the processing network node. This transmission time is conventionally estimated by separate exchange of messages between neighboring network nodes, which is associated with additional complexity and leads to estimation errors.

SUMMARY OF THE INVENTION

It is an object of the invention to provide a method for time synchronization in a communication network which enables simple and accurate synchronization of the time in the network nodes of the communication network.

This and other objects and advantages are achieved in accordance with the invention in which a method is provided for time synchronization in a communication network comprising a multiplicity of network nodes with one master node and a plurality of slave nodes, where the master node detects a master time with a master clock and each slave node detects a slave time with an internal clock. In this case, synchronization messages are transmitted in the communication network, where the synchronization message received in a slave node contains synchronization information that is used for synchronizing the slave time of the slave node with the master time.

In accordance with the method of the invention, a closed topology comprising communication paths between neighboring network nodes is predefined, where the closed topology defines a first transmission direction and an opposite second transmission direction between neighboring network nodes of the communication network. Proceeding from the master node, the synchronization messages are forwarded in the closed topology such that at least one portion of the slave nodes of the communication network each receive a first synchronization message from the first transmission direction and a second synchronization message from the second transmission direction.

A respective slave node of the at least one portion of the slave nodes determines a first time, which is synchronized based on the synchronization information of the first synchronization message, and also a second time, which is synchronized based on the synchronization information of the second synchronization message. An averaged time is then determined by the arithmetic averaging of the first and second times. In this case, the items of synchronization information of the first and second synchronization messages are configured such that the averaged time corresponds to the master time.

The invention is based on the insight that, via synchronization messages that are received by a slave node in different directions in a closed topology, items of synchronization information can be defined such that the master time can be derived from the averaging of the times that result from the synchronization messages, without information on the transmission time between the nodes additionally having to be communicated.

In one embodiment of the method in accordance with the invention, the closed topology is a ring topology, where the master node sends the first synchronization message in the first transmission direction of the ring topology and the second synchronization message in the second transmission direction of the ring topology. The closed topology can likewise be a line topology leading from the master node in the first transmission direction to a reflecting slave node and from there back again to the master node. In this case, the master node emits the first synchronization message in the first transmission direction. The first synchronization message becomes the second synchronization message upon forwarding by the reflecting slave node.

In one particularly preferred embodiment of the invention, within a cycle of the communication of a first and second synchronization message by the closed topology, a respective slave node, upon forwarding the first and second synchronization messages, adds to the synchronization information an internal processing time (bridge delay) between reception and emission of the first and respectively second synchronization messages and also a predetermined transmission time which is fixed within the cycle. In the case of a ring topology, a cycle of the communication of a first and second synchronization message is provided here by the successive emission of a first and second synchronization message. In the case of a line topology, a cycle describes the transmission of a synchronization message from the master node to the reflecting slave node and from there back again to the master node, where the synchronization message as far as the reflecting slave node constitutes the first synchronization message and subsequently constitutes the second synchronization message. The above-mentioned predetermined transmission time is set or controlled in the master node to the average transmission time of the first and respectively second synchronization messages along a communication path. Accordingly, the actual line delay between the individual network nodes does not have to be known.

In one preferred embodiment of the above embodiment, the control to the average transmission time in the master node is effected such that the master node determines, from the first or second synchronization message received in a cycle, an error between the actual accumulated transmission time along all communication paths of the closed topology and the accumulated transmission time in accordance with the synchronization information from the first or second synchronization message. Based on this error, the master node then determines a new average transmission time for the next cycle.

In one particularly preferred embodiment, the control to the average transmission time is realized based on following relationship:

$$LD(k+1)=LD(k)+k_i \cdot e(k), \quad \text{(Eq. 1)}$$

where LD(k) is the average transmission time for the current cycle, where LD(k+1) is the new average transmission time for the next cycle, where e(k) is the error between the actual accumulated transmission time and the accumulated transmission time corresponding to the synchronization information, and where $k_i$ is a control parameter.

In order to achieve a stable control, the control parameter is particularly set such that the following relationship holds true:

$$|1-k_i \cdot (N+1)|<1,$$

where N corresponds to the number of slave nodes in the closed topology.

In a further embodiment of the invention, the predetermined transmission time is communicated in a field of the first and second synchronization messages, as a result of which the individual slave nodes acquire knowledge about the transmission time defined by the master node.

In a further, particularly preferred embodiment, the synchronization information of the first and second synchronization messages comprises the master time at the instant of the emission of the corresponding first and respectively second synchronization messages and also at least one correction field, to which a respective slave node, upon forwarding a first and respectively second synchronization message, adds its internal processing time and the predetermined transmission time. Here, the at least one correction field preferably comprises a first field, in which exclusively the internal processing times are added, and also a second field, in which exclusively the predetermined transmission times are added.

In a further embodiment, a respective slave node determines a slave time via an estimated rate compensation factor (RCF) corresponding to the ratio of the clock frequency of the master clock to the clock frequency of the internal clock of the respective slave node. In this case, the RCF factor or the estimation thereof is sufficiently known from the prior art and will not be described in any further detail. Conventionally, both the transmission time between neighboring nodes and the internal processing time are used for estimating the RCF factor. In one preferred embodiment of the invention, where a first and a second field are provided as correction fields in the synchronization messages, the RCF factor is estimated only using the first field. This ensures that the estimation of the RCF factor is not influenced by the predetermined transmission times that do not correspond to the actual transmission times. An accurate estimation of the RCF factor is ensured in this way.

In a further embodiment, where a ring topology is used, the synchronization information of the first synchronization message comprises no information on the transmission time along communication paths. Within a cycle of the communication of a first and second synchronization message by the closed topology, in this case a respective slave node, upon forwarding the first synchronization message, adds to the synchronization information exclusively its internal processing time between reception and emission of the first synchronization message. Analogously, the respective slave node, upon forwarding a second synchronization message, adds to the synchronization information exclusively its internal processing time between reception and emission of the second synchronization message. However, the respective slave node furthermore transmits an accumulated transmission time (estimated in the master node) along all communication paths of the closed topology as part of the synchronization information of the second synchronization message. In this case, the accumulated transmission time is preferably added to the master time at the instant of the emission of the second synchronization message. As a result, an accurate synchronization with the master time can be achieved in a simple manner even without the transmission of predetermined average transmission times.

In one preferred embodiment, a respective slave node in turn determines a slave time via the estimated RCF factor as described above. In this case, the RCF factor is preferably determined only using the internal processing time in the first and/or second synchronization messages without taking into account transmission times along communication paths.

In a further embodiment of the method in accordance with the invention, where a line topology is used as the closed topology, the synchronization information of both the first and second synchronization messages comprises first and second synchronization information. The first synchronization information comprises no information on transmission times along communication paths. A respective slave node, upon forwarding both a first and a second synchronization message, adds to the first synchronization information exclusively an internal processing time between reception and emission of the first and respectively second synchronization messages and furthermore communicates as second synchronization information an accumulated transmission time (estimated in the master node) along all the communication paths. Here, the first time is determined based on the first synchronization information of the first synchronization message received in the respective slave node, and the second time is determined based on the first and second synchronization information of the second synchronization message received in the respective slave node.

In a preferred embodiment of the above-described embodiment, the respective slave node in turn determines a slave time via an estimated RCF factor. In this case, the RCF factor is preferably determined only using the first synchronization information without taking into account the second synchronization information, as a result of which an accurate estimation of the RCF factor is achieved.

The method in accordance with the invention can be used in various standards for time synchronization, i.e., in IEEE standard 1588, IEC standard 61588 (in particular IEC standard 61588 Type 10), or IEEE standard 802.1AS. In a further preferred embodiment, the network nodes in the communication network communicate based on the PROFINET standard known per se.

One preferred application of the method in accordance with the invention is time synchronization in an industrial automation system in which operation sequences of different network nodes in general often have to be coordinated with one another with accurate timing.

Besides the method described above, the invention furthermore comprises a communication network comprising a multiplicity of network nodes with one master node and a plurality of slave nodes, where the master node can detect a master time with a first clock and each slave node can detect a slave time with an internal clock, wherein synchronization messages can be transmitted in the communication network, and where the synchronization message received in a slave node contains synchronization information that is used for synchronizing the slave time of the slave node with the master time. Here, the communication network is configured such that the method in accordance to the invention or one or more preferred embodiment of the method in accordance with the invention can be performed in the communication network.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are described in detail below with reference to the accompanying figures, in which.

DETAILED DESCRIPTION OF THE PREFERRED EMBODIMENTS

The embodiments of the method in accordance with the invention that are described below serve, in a communication network comprising one master node and a plurality of slave nodes, to synchronize the slave times measured by the slave nodes with the master time measured by the master node. In this case, each slave node comprises an internal clock having a corresponding clock frequency for detecting the slave time. A master clock having a clock frequency for measuring the master time is likewise provided in the master node.

Firstly, an embodiment of the method in accordance with the invention based on the ring topology in FIG. 1 will be explained. One master node MA and also six slave nodes SL1, SL2, . . . , SL6 are provided in this topology, the number of slave nodes being merely exemplary. The master node and the slave nodes are arranged in a ring comprising seven communication paths PA1 to PA7, such that a message emitted by the master node and successively forwarded by the slave nodes returns to the master node again in both directions of the ring. Synchronization messages are used for synchronization purposes, where synchronization messages SYN1 are emitted by the master node in the direction toward the left in the ring and are forwarded by the slave nodes and synchronization messages SYN2 are emitted by the master node in the direction toward the right in the ring and are forwarded by the slave nodes.

Conventionally, a synchronization message is forwarded from the master node to the slaves nodes, where each slave node adds an internal processing time (a Bridge Delay) and a time delay of the transmission from the preceding node to itself (a Line Delay) to a corresponding correction field. In this case, the line delay is estimated separately by a separate method in each slave node. Such an estimation of the line delay can be dispensed with in the method of the invention, as will be explained in greater detail below.

Figure 1:
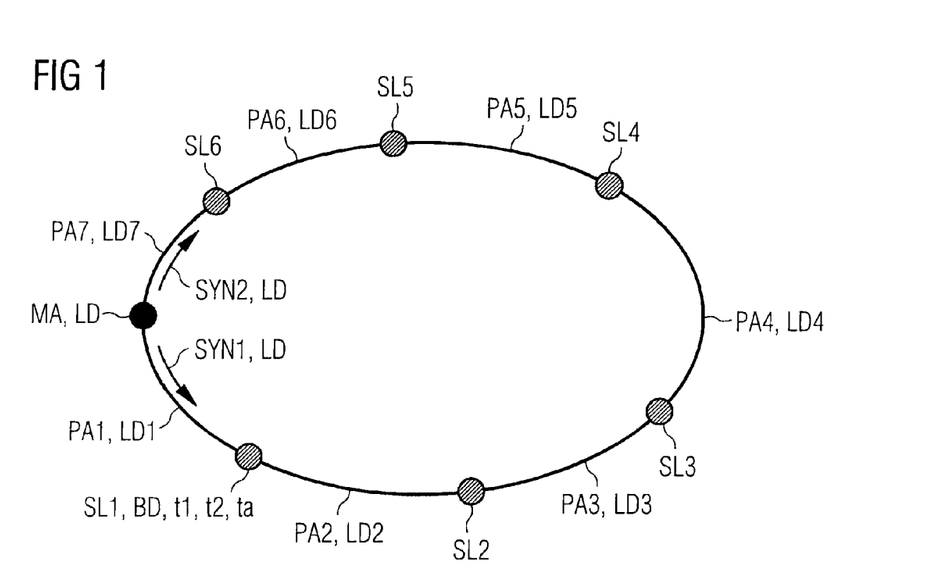
FIG. 1 shows an exemplary ring topology in which embodiments of the method in accordance with the invention are performed.

The master node MA sends, in a cycle in accordance with FIG. 1, the first synchronization message SYN1 in the direction left through the ring and the second synchronization message SYN2 in the direction right through the ring, as is indicated by corresponding arrows. The synchronization message SYN1 is transmitted back along the paths PA1, PA2, PA7 to the master node. The synchronization message SYN2 is likewise communicated back to the master node via the paths PA7, PA6, PA1. The individual actual line delays on the individual communication paths PA1 to PA7 are designated by LD1 to LD7 in FIG. 1. At the beginning of a cycle, a predetermined transmission time or line delay LD is defined or determined in the master node MA and is communicated within the synchronization messages SYN1 and SYN2 from node to node. In this case, each slave node adds this line delay to a correction field of the synchronization message SYN1 and respectively SYN2. In the same way, each slave node also adds a corresponding bridge delay to the correction field or a separate correction field. In FIG. 1, the bridge delay is designated by BD only for the node SL1. In this case, the bridge delay can be different from node to node.

Once the master node MA finally receives the synchronization message SYN1 and respectively SYN2, it likewise adds the line delay LD to the value of the corresponding correction field and subsequently determines the error between the actual accumulated delay time corresponding to the line delays LD1 to LD7 and the delay time corresponding to the sum of the line delays LD. In this case, it should be taken into account that each synchronization message comprises the master time upon emission of the message at the master node. Accordingly, the master node, upon re-receiving the synchronization message, can determine the difference between the master time upon the message being re-received and the master time upon the emission of the message and can subtract from this difference the sum of the line delays LD and bridge delays BD along the paths PA1 to PA7, which corresponds to the abovementioned error.

By means of a controller, the master node then determines for the first and respectively second synchronization messages SYN1 and SYN2 a new line delay, which the master node communicates in the next cycle in the corresponding synchronization messages and which is then re-added by the slave nodes in a corresponding correction field. In the presently described embodiment, an I controller is used based on the following relationship for calculating a new line delay:

$$LD(k+1)=LD(k)+k_i \cdot e(k).$$

In this case, $LD(k)$ denotes the predefined transmission time in the k-th cycle, and $e(k)$ denotes the above-described error in the k-th cycle. Here, the error can be determined based on a received first or second synchronization message. $LD(k+1)$ is the line delay to be used in the (k+1)-th cycle, and $k_i$ is a predetermined factor chosen such that the control is stable. This is ensured if $|1-k_i \cdot (N+1)|<1$ holds true, where N is the number of slave nodes in the corresponding ring.

By means of the above-described controller, after an initialization phase of a plurality of cycles, a value for LD is established which corresponds to the average transmission time in the ring along a communication path between two neighboring nodes. If the method is started with LD=0 (i.e., LD(0)=0), in one preferred embodiment the above controller is first used for determining LD(2) and LD(1) is chosen as follows:

$$LD(1)=e(0)/(N+1).$$

This is possible whenever the number N of slave nodes is known in the master node.

In the context of the synchronization, each slave node then determines a first time t1 based on the (accumulated) line delay and bridge delay in the received synchronization message SYN1 and a second time t2 based on the (accumulated) line delay and the bridge delay in the received synchronization message SYN2. That is, the first time t1 is synchronized with the synchronization information of the first synchronization message SYN1 and the second time t2 is synchronized with the synchronization information of the second synchronization message SYN2. The determination of such synchronized times is known per se. In this case, a slave node corrects its slave time using the line delay and bridge delay in the received synchronization messages. The arithmetic mean value ta is subsequently formed from t1 and t2 in the corresponding slave node. In FIG. 1, the times t1, t2 and ta are indicated here only for the slave node SL1. The mean value ta necessarily constitutes the synchronized master time, as can be substantiated by the following consideration.

From the point of view of the slave node SLi, the following error err1 was made upon the forwarding of the synchronization message SYN1:

$$err1=i \cdot LD-(LD1+LD2+ \ldots +LDi).$$

By contrast, the following error err2 was made upon the forwarding of the synchronization message SYN2:

$$err2=(N+1-i) \cdot LD-(LD(i+1)+ \ldots +LD(N+1)).$$

During the averaging of the times t1 and t2, these two errors are likewise averaged. Since the sum of all the line delays LD1 to LD(N+1) corresponds to the sum of the line delays LD (in this regard, the line delay LD was determined by the master node in accordance with the above controller), this error disappears during the averaging, as is evident from the following relationship:

$$err1+err2=(N+1) \cdot LD-(LD1+ \ldots +LD(N+1))=0.$$

Consequently, the synchronized master time can be determined in a simple manner in each of the slave nodes, without the individual line delays LD1 to LD(N+1) having to be explicitly determined.

Figure 2:
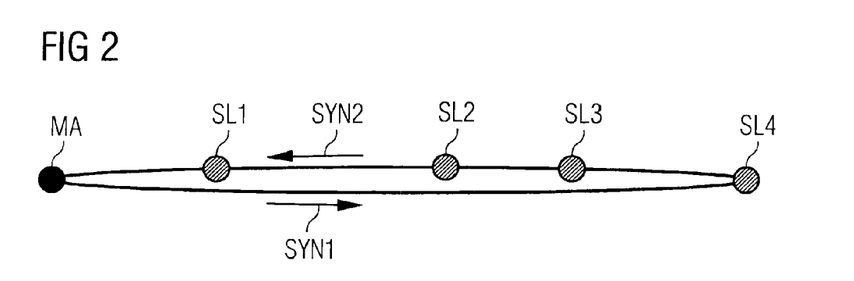
FIG. 2 shows an exemplary line topology in which embodiments of the method in accordance with the invention are performed.

Instead of being applied to a ring topology, the above method can also be applied to a line topology in a simple manner. Such a line topology is shown in FIG. 2. Reference signs for the corresponding line delays, bridge delays and communication paths have been omitted in FIG. 2, for reasons of clarity. Analogously to FIG. 1, the master node is designated by MA and the corresponding slave nodes are designated by SL1, SL2 to SL4. The master node MA always sends a synchronization message in the form of a synchronization message SYN1 in the direction of the node SL1, where the message is forwarded from there via the nodes SL2 and SL3 to the node SL4. Here, the node SL4 constitutes a reflecting node that then sends the message back to the master node MA again via the nodes SL3, SL2 and SL1. In accordance with the above terminology, in this case first synchronization messages SYN1 are such messages that are transmitted from the master node to the reflecting slave node SL4, and synchronization messages SYN2 are such synchronization messages that are transmitted from the reflecting slave node back to the master node MA.

Analogously to FIG. 1, in this case a line delay LD is once again predefined, which is transmitted within the first and second synchronization messages SYN1 and SYN2, where each slave node adds the line delay LD and also its bridge delay BD to the received first and respectively second synchronization messages in a corresponding correction field. The determination of the line delay LD is configured just like in the method in FIG. 1, i.e., the master node MA determines the line delay via a corresponding controller that controls the line delay to the average transmission time in the line topology along a communication path between two neighboring nodes.

In the line topology in FIG. 2, each of the slave nodes SL1 to SL3 that receives both the first synchronization message SYN1 and the second synchronization message SYN2 determines the above-described first time t1, which is synchronized with the first synchronization message, and also the second time t2, which is synchronized with the second synchronization message. The synchronized master time is once again obtained by the averaging of these times. For the slave node SL4, only the first time t1 can be determined on the basis of the synchronization message SYN1. The slave node SL4 is the reflecting node in the line topology. As a result, this time necessarily corresponds to the synchronized master time.

As already mentioned above, the summation of the line delays and the bridge delays upon the forwarding of the synchronization messages can occur, if appropriate, in separate correction fields of the messages. This embodiment has the advantage that a local RCF estimation of the slave nodes can be performed in a manner decoupled from the estimation of the line delays. In this case, the rate compensation factor (RCF) indicates the ratio between the clock frequency of the master clock and the corresponding internal clock of the slave node. Corresponding methods for estimating this value are known per se from the prior art. Both the line delays and the bridge delays are usually taken into account in an RCF estimation in the prior art. In the case where the summed line delays and respectively bridge delays are stored in separate fields, the RCF estimation can be effected based only on the bridge delays. That is, the summed line delays, which do not correspond to the actual line delay, are masked out during the RCF estimation, as a result of which the estimation becomes more accurate.

Alternatives to the methods described above are explained below based on a ring topology. Analogously to the method in FIG. 1, synchronization messages SYN1 are forwarded on the left along the ring and synchronization messages SYN2 are forwarded on the right along the ring. In a cycle, in this case, without any restriction of generality, firstly the synchronization messages SYN1 are communicated and only afterward are the synchronization messages SYN2 communicated. The messages SYN1 include the master time upon the emission of the message at the master. The slave nodes, upon forwarding the synchronization message SYN1, only compensate for the bridge delays, by adding their bridge delay to a corresponding correction field. A local compensation of the line delays does not occur. When the synchronization message SYN1 arrives at the master node MA again, the master node estimates, via methods known per se, the accumulated line delay along all the transmission paths in the ring (e.g., with a filter or a controller). In this case, the accumulated line delay results from the difference between the master time upon the message SYN1 arriving again and the sum of the master time upon the emission of the message SYN1 at the master and the accumulated bridge delays in the corresponding correction field. In this case, the master time upon the emission of the message SYN1 is communicated within the message SYN1. If appropriate, the bridge delay can also be added directly to the master time upon each occasion of the forwarding of the message.

Afterward, the synchronization messages SYN2 are communicated round to the right in the ring proceeding from the master node MA. The messages include the estimated accumulated line delay. In this case, the line delay can be added to the time of the master upon the emission of the message SYN2. In this case, no separate field is required for communicating the accumulated line delays. Furthermore, the accumulated bridge delays are also once again stored in a corresponding correction field of the message SYN2 or added directly to the master time.

Analogously to the method described above, each slave node then once again determines a first time t1 based on the synchronization information from the first synchronization message SYN1 and a second time t2 based on the synchronization information from the second synchronization message SYN2. Afterward, the respective slave node forms the mean value from the times t1 and t2. The mean value to then once again corresponds to the synchronized master time, as is evident from the following considerations.

Upon application of the above method, for the times t1 and t2 the following errors err1 and respectively err2 arise in the slave node SLi:

err1=0·LD−(LD1+LD2+ . . . +LDi), err2=(N+1)·LD−(LD(i+1)+ . . . +LD(N+1)).

The sum of these two errors disappears in the course of the averaging over the times t1 and t2, such that the correct master time is reconstructed at each slave node.

If appropriate, instead of being applied in a ring topology, the method just described can also be applied in a line topology corresponding to FIG. 2. In this case, the accumulated bridge delay and also the estimated accumulated line delay are communicated both in the synchronization message SYN1 and in the synchronization message SYN2. In this case, the first time t1 in accordance with a received first synchronization message SYN1 is determined based only on the accumulated bridge delay without taking account of the accumulated line delay, whereas the second time t2 is determined based on both the accumulated bridge delay and the accumulated line delay of a received second synchronization message SYN2.

Figure 3:
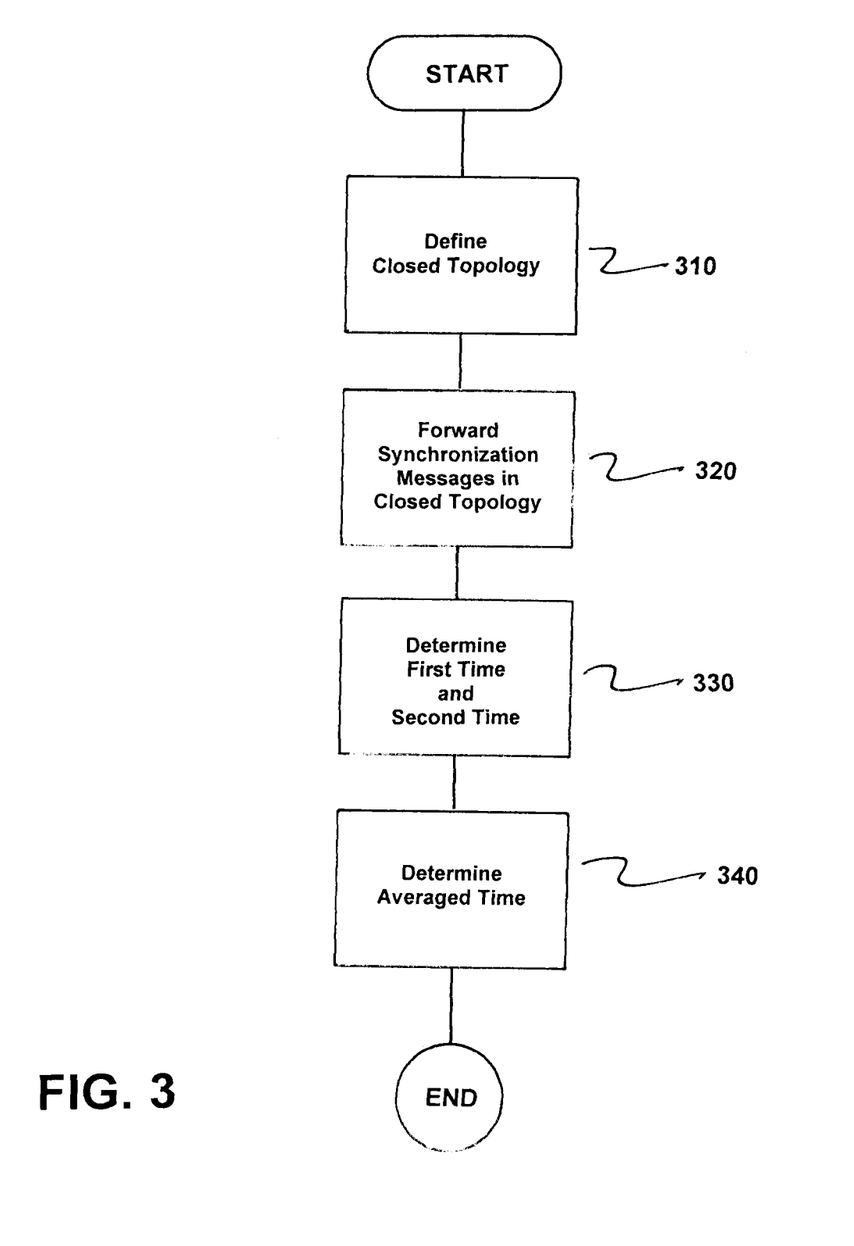
FIG. 3 shows a flowchart of the method in accordance with the invention.

The above-described alternative embodiments have the advantage that, if appropriate, no additional fields are required in the synchronization messages. In particular, no averaged line delay has to be communicated between the nodes. Furthermore, once again it is possible for only the bridge delays to be used in the estimation of the RCF value in a respective slave node. FIG. 3 is a flowchart of a method for time synchronization in a communication network comprising a multiplicity of network nodes with a master node which detects a master time with a master clock and a plurality of slave nodes in which each slave node detects a slave time with an internal clock, synchronization messages being transmitted in the communication network and the synchronization message received in a slave node of the plurality of slave nodes containing synchronization information for synchronizing the slave time of each slave node to the master time.

The method comprises defining a closed topology comprising communication paths between neighboring network nodes, as indicated in step 310. Here, the closed topology defines a first transmission direction and an opposite second transmission direction between neighboring network nodes.

Next, proceeding from the master node, the synchronization messages in the closed topology are forwarded such that at least one portion of each slave node of the plurality of slave nodes receives a first synchronization message from the first transmission direction and a second synchronization message from the second transmission direction, as indicated in step 320.

A first time is now determined, by a respective slave node of the at least one portion of each slave node of the plurality of slave nodes, which is synchronized based on synchronization information of the first synchronization message, and a second time, which is synchronized based on synchronization information of the second synchronization message, as indicated in step 330.

An averaged time is then determined by arithmetically averaging the first and second times, as indicated in step 340. In accordance with the method of the invention, items of synchronization information of the first and second synchronization messages are configured such that the averaged time thus corresponds to the master time.

In all of the above-described embodiments of the method in accordance with the invention, a local determination of the line delays in individual network nodes is obviated. The determination of local line delays has the disadvantage that errors occurring here are not identified by the slave nodes during operation. Instead, the error is passed on to the next slave node. Such errors are avoided in accordance with the invention, because the master node, by corresponding modification of the communicated line delays, ensures that the line delays are determined and compensated for correctly on average. A better accuracy than with conventional methods can therefore be achieved.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for time synchronization in a communication network comprising a multiplicity of network nodes with a master node which detects a master time with a master clock and a plurality of slave nodes in which each slave node detects a slave time with an internal clock, synchronization messages being transmitted in the communication network and the synchronization message received in a slave node of the plurality of slave nodes containing synchronization information for synchronizing the slave time of each slave node to the master time, the method comprising:

defining a closed topology comprising communication paths between neighboring network nodes, the closed topology defining a first transmission direction and an opposite second transmission direction between neighboring network nodes;

forwarding, proceeding from the master node, the synchronization messages in the closed topology such that at least one portion of each slave node of the plurality of slave nodes receives a first synchronization message from the first transmission direction and a second synchronization message from the second transmission direction, a single predetermined transmission time being defined or determined in the master node and the same single predetermined transmission time being communicated within the synchronization messages from node to node in a first cycle;

determining, by a respective slave node of the at least one portion of each slave node of the plurality of slave nodes, a first time, which is synchronized based on synchronization information of the first synchronization message, and a second time, which is synchronized based on synchronization information of the second synchronization message; and determining an averaged time by arithmetically averaging the first and second times;

wherein items of synchronization information of the first and second synchronization messages are configured such that the averaged time corresponds to the master time.

2. The method as claimed in claim 1, wherein the closed topology is a ring topology, wherein the master node sends the first synchronization message in the first transmission direction of the ring topology and the second synchronization message in the second transmission direction of the ring topology.

3. The method as claimed in claim 1, wherein the closed topology is a line topology leading from the master node in the first transmission direction to a reflecting slave node and from the reflecting slave node back to the master node; and
wherein the master node emits the first synchronization message in the first transmission direction; and
wherein the first synchronization message becomes the second synchronization message upon being forwarded by the reflecting slave node.

4. The method as claimed in claim 1, wherein the closed topology is a line topology leading from the master node in the first transmission direction to a reflecting slave node and from the reflecting slave node back to the master node;
wherein the master node emits the first synchronization message in the first transmission direction; and
wherein the first synchronization message becomes the second synchronization message upon being forwarded by the reflecting slave node.

5. The method as claimed in claim 1, wherein, within a communication cycle of a first and second synchronization message by the closed topology, the respective slave node, upon forwarding the first and second synchronization messages, adds to the synchronization information an internal processing time between reception and emission of the first and respectively second synchronization messages and a predetermined transmission time which is fixed within the cycle; and wherein the predetermined transmission time is set or controlled in the master node to an average transmission time of the first and respectively second synchronization messages along a communication path.

6. The method as claimed in claim 5, wherein the control to the average transmission time is effected such that the master node determines, from the first or second synchronization message received in the communication cycle, an error between the actual accumulated transmission time along all communication paths of the closed topology and the accumulated transmission time corresponding to the synchronization information from the first or second synchronization message; and wherein a new average transmission time is determined within the master node for a next cycle based on the determined error.

7. The method as claimed in claim 6, wherein the control to the average transmission time is in accordance with the following relationship:

$$LD(k+1)=LD(k)+k_i \cdot e(k);$$

wherein $LD(k)$ is an average transmission time for a current communication cycle;
wherein $LD(k+1)$ is a new average transmission time for a next communication cycle;
wherein $e(k)$ is an error between an actual accumulated transmission time and an accumulated transmission time corresponding to the synchronization information; and
wherein $k_i$ is a control parameter.

8. The method as claimed in claim 5, wherein the predetermined transmission time is communicated in a field of the first and second synchronization messages.

9. The method as claimed in claim 5, wherein the synchronization information of the first and second synchronization messages comprises the master time at an instant of an emission of the first and respectively second synchronization messages at the master and at least one correction field, to which a respective slave node, upon forwarding a first and respectively second synchronization message, adds its internal processing time and the predetermined transmission time.

10. The method as claimed in claim 9, wherein the at least one correction field comprises a first field, in which exclusively the internal processing times are added, and a second field, in which exclusively the predetermined transmission times are added.

11. The method as claimed in claim 10, wherein the respective slave node determines a slave time via an estimated rate compensation factor (RCF) corresponding to a ratio of a clock frequency of the master clock to a clock frequency of an internal clock of the respective slave node; and wherein the RCF factor is estimated only using the first field.

12. The method as claimed in claim 2, wherein the synchronization information of the first synchronization message comprises no information on transmission times along communication paths;

wherein, within a cycle of the communication of a first and second synchronization message by the closed topology, the respective slave node, upon forwarding the first synchronization message, adds to the synchronization information exclusively its internal processing time between reception and emission of the first synchronization message and the respective slave node, upon forwarding a second synchronization message, adds to the synchronization information exclusively its internal processing time between reception and emission of the second synchronization message and transmits an accumulated transmission time, estimated in the master node, along all communication paths of the closed topology as part of the synchronization information of the second synchronization message.

13. The method as claimed in claim 12, wherein the respective slave node determines a slave time via an estimated rate compensation factor (RCF) corresponding to a ratio of a clock frequency of the master clock to a clock frequency of an internal clock of the respective slave node; and wherein the RCF factor is determined only using the internal processing times in at least one of the first synchronization message and the second synchronization messages without taking into account transmission times along the communication paths.

14. The method as claimed in claim 3, wherein the synchronization information of both the first and second synchronization messages comprises first and second synchronization information;

wherein the first synchronization information comprises no information on transmission times along communication paths;

wherein the respective slave node, upon forwarding both the first and second synchronization messages, adds to the first synchronization information exclusively an internal processing time between reception and emission of the first and respectively second synchronization messages and communicates as second synchronization information an accumulated transmission time, estimated in the master node, along all communication paths of the closed topology; and wherein the first time is determined based on the first synchronization information of the first synchronization message received in the respective slave node, and the second time is determined based on the first and second synchronization information of the second synchronization message received in the respective slave node.

15. The method as claimed in claim 14, wherein the respective slave node determines a slave time via an estimated rate compensation factor (RCF) corresponding to a ratio of a clock frequency of the master clock to a clock frequency of an internal clock of the respective slave node;

wherein the RCF factor is determined only using the first synchronization information without taking into account the second synchronization information.

16. The method as claimed in claim 1, wherein the time synchronization is based on one of Institute of Electrical and Electronic Engineers (IEEE) standard 1588, and IEEE standard 802.1AS and International Electrotechnical Commission (IEC) standard 61588.

17. The method as claimed in claim 1, wherein the multiplicity of network nodes intercommunicate based on the PROFINET standard.

18. The method as claimed in claim 1, wherein the method is implemented in an industrial automation system.

19. A communication network comprising:
a multiplicity of network nodes including:
a master node which detects a master time with a first clock; and
a plurality of slave nodes in which each slave node detects a slave time with an internal clock, synchronization messages being transmittable in the communication network, and a synchronization message received in a slave node containing synchronization information for synchronizing the slave time of the slave node with the master time,
wherein the communication network is configured to:
predefine a closed topology comprising communication paths between neighboring network nodes, the closed topology defining a first transmission direction and an opposite second transmission direction between neighboring network nodes;
forward, proceeding from the master node, the synchronization messages in the closed topology such that at least one portion of each slave node of the plurality of slave nodes receives a first synchronization message from the first transmission direction and a second synchronization message from the second transmission direction, a single predetermined transmission time being defined or determined in the master node and the same single predetermined transmission time being communicated within the synchronization messages from node to node in a first cycle;
determine, by a respective slave node of the at least one portion of each slave node of the plurality of slave nodes, a first time, which is synchronized based on the synchronization information of the first synchronization message, and a second time, which is synchronized based on the synchronization information of the second synchronization message; and
determine an averaged time by the arithmetically averaging the first and second times; and
wherein items of synchronization information of the first and second synchronization messages are configured such that the determined averaged time corresponds to the master time.

20. The communication network as claimed in claim 19, wherein the closed topology is a ring topology; and
wherein the master node sends the first synchronization message in the first transmission direction of the ring topology and the second synchronization message in the second transmission direction of the ring topology.

21. The communication network as claimed in claim 19, wherein the closed topology is a line topology leading from the master node in the first transmission direction to a reflecting slave node and from the reflecting slave node back to the master node;
wherein the master node emits the first synchronization message in the first transmission direction; and
wherein the first synchronization message becomes the second synchronization message upon being forwarded by the reflecting slave node.

* * * * *